United States Patent Office 3,169,146
Patented Feb. 9, 1965

3,169,146
1-n-DODECYL-2-DICHLOROACETYLGUANIDINE
Arthur F. McKay, Beaconsfield, Quebec, Canada, assignor to Monsanto Canada Limited, La Salle, Quebec, Canada
No Drawing. Filed July 29, 1963, Ser. No. 298,449
1 Claim. (Cl. 260—561)

This invention relates to the new bactericidal compound 1-n-dodecyl-2-dichloroacetylguanidine and its salts and to compositions in which it is an active constituent.

This new compound is represented by the generic formula:

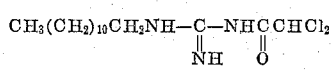

It has been found to be an unexpectedly potent bacteriostat effective against both gram-positive and gram-negative organisms. 1 - n-dodecyl-2-dichloroacetylguanidine inhibited the growth of the following organisms at the dilutions indicated: *Staph. pyogenes* (penicillin sensitive) (1:20,480,000), *Staph. pyogenes* (pencillin resistant) (1:5,120,000), *Sarcina lutea* (1:20,480,000), *Strept. faecalis* (1:640,000), *E. coli* No. 198 (1:160,000), *Aero. aerogenes* (1:160,000), *S. pullorum* (1:320,000), *Ps. Aeruginosa* (1:80,000), *Pr. mirabilis* (1:40,000), *Pr. vulgaris* (1:40,000).

Because of its high anti-bacterial activity it is useful for many purposes, for example in medical and surgical practice for sterilization of instruments or of body tissues, as a general disinfectant, as an addition to wood pulp to deter growth of fungi and bacteria, as an industrial preservative, in the control of slime in paper mills and as a mothproofing agent for textiles.

The compound of this invention is useful per se but it is preferable that it be applied in a dispersed form in a suitable extending agent.

In this application it is to be understood that the term "dispersed" is used in its widest possible sense. When it is said that the reaction product of this invention is dispersed it means that the particles of the reaction product of this invention may be molecular in size and held in true solution in a suitable organic solvent. It means further that the particles may be colloidal in size and distributed throughout a liquid phase in the form of suspensions or emulsions or in the form of particles held in suspension by wetting agents. It also includes particles which are distributed in a semi-solid viscous carrier such as petrolatum or soap or other ointment base in which they may be actually dissolved in the semi-solid or held in suspension in the semi-solid with the aid of suitable wetting emulsifying agents. The term "dispersed" also means that the particles may be mixed with and distributed throughout a solid carrier providing a mixture in particulate form, e.g. pellets, tablets, granules, powders, or dusts.

In the instant specification and appended claim it is to be understood that the expression "extending agent" includes any and all of those substances in which the reaction product of this invention is dispersed. It includes, therefore, the solvents of a true solution, the liquid phase of suspensions or emulsions, the semi-solid carrier of ointments and the solid phase of particulate solids, e.g. pellets, tablets, granules, dusts and powders.

The exact concentration of the reaction product this invention employs in combatting or controlling noxious life can vary considerably provided the required dosage (i.e. toxic or lethal amount) thereof is supplied to the noxious life or to the environment of the noxious life. When the extending agent is a liquid or mixture of liquids (e.g. as in solutions, suspensions, emulsions, etc.) the concentration of the reaction product employed to supply the desired dosage generally will be in the range of 0.01 to 25 percent by weight. When the extending agent is a semi-solid, or solid, the concentration of the reaction product employed to supply the desired dosage generally will be in the range of 0.1 to 25 percent by weight.

The invention is illustrated but not limited by the following example:

*1-n-dodecyl-2-dichloroacetylguanidine*

A solution of 2.27 gs. of dodecylguanidine in 10 ml. of warm methanol was mixed with 6.0 ml. of ethyl dichloroacetate. The solution was warmed to its boiling point and boiled for about 20 minutes. The solvent was then removed under reduced pressure. The residual, a pasty mass, solidified in 48 hours at room temperature. These solids were crushed and triturated with ether to give 0.45 g. of white powder, M.P. 124–125° C., which on crystallization from ether-petroleum ether gave crystalline flakes, M.P. 126–127° C.

The brown filtrate on evaporation separated as solids in 48 hours. The solids were crushed and triturated with n-pentane and filtered to give 2.7 gs. of white shiny crystals, M.P. 114–116° C. Recrystallization from acetone (30 ml.) and petroleum ether, 200 ml. (30–60°), gave after concentration to about 100 ml., 2.3 gs. of white solids, M.P. 125–126° C., identical with the crystalline flakes obtained before.

*Analysis.*—Percent calculated for $C_{15}H_{29}N_3Cl_2O$: C, 50.56; H, 8.71; N, 11.79; Cl, 19.94. Found: C, 50.78; H, 8.64; N, 11.71; Cl, 20.41.

What is claimed is:
1. 1-n-dodecyl-2-dichloroacetylguanidine.

References Cited by the Examiner
UNITED STATES PATENTS
2,826,578  3/58  Perron _____ 260—561 X
2,852,560  9/58  Brust _____ 260—561 X IRVING MARCUS, *Primary Examiner.*
NICHOLAS S. RIZZO, *Examiner.*